US008816897B2

(12) United States Patent
Bon et al.

(10) Patent No.: US 8,816,897 B2
(45) Date of Patent: Aug. 26, 2014

(54) METHOD FOR ESTIMATING THE ANGULAR POSITION OF A TARGET BY RADAR DETECTION AND RADAR IMPLEMENTING SAID METHOD

(75) Inventors: Nicolas Bon, Brest (FR); Jean-Michel Quellec, Ploumoguer (FR)

(73) Assignee: Thales, Neuilly sur Seine (FR)

( * ) Notice: Subject to any disclaimer, the term of this patent is extended or adjusted under 35 U.S.C. 154(b) by 405 days.

(21) Appl. No.: 13/297,146

(22) Filed: Nov. 15, 2011

(65) Prior Publication Data

US 2012/0127025 A1 May 24, 2012

(30) Foreign Application Priority Data

Nov. 23, 2010 (FR) ...................................... 10 04559

(51) Int. Cl.
*G01S 13/53* (2006.01)
*G01S 13/64* (2006.01)
(52) U.S. Cl.
CPC ..................... *G01S 13/53* (2013.01); *G01S 13/64* (2013.01)
USPC ............ 342/113; 342/107; 342/110; 342/149
(58) Field of Classification Search
USPC .................. 342/149, 107, 110, 113
See application file for complete search history.

(56) References Cited

U.S. PATENT DOCUMENTS

| 3,713,154 | A | 1/1973 | Kummer |
| 4,034,373 | A | 7/1977 | de Pierre et al. |
| 6,204,804 | B1 * | 3/2001 | Andersson ..................... 342/113 |

OTHER PUBLICATIONS

J. C. Curlander and R. N. McDonough: "Synthetic Aperture Radar—Systems and Signal Processing (passage)", Jan. 1, 1991, John Wiley and Sons, New York, NY, USA, XP007921734, ISBN: 0-471-85770-X pp. 16-21, p. 17, line 4-line 16.

* cited by examiner

*Primary Examiner* — Matthew M Barker
(74) *Attorney, Agent, or Firm* — Baker Hostetler LLP

(57) ABSTRACT

A method of estimating the angular position $\theta_c$ of a target detected by a radar equipping a mobile carrier and emitting, via an steerable antenna, a signal, in the form of pulses, towards the target and receiving echoes from the reflection of said signal on the target, comprises: estimating, for each pulse or group of pulses of time index i, the angular position $\theta(i)$ of the antenna; estimating, for each pulse or group of pulses of time index i, the Doppler frequency $f_D(i)$ of the echo or echoes received; pairing, for each pulse or group of pulses of time index i, the angular position $\theta(i)$ and the Doppler frequency $f_D(i)$; and, estimating the angular position $\theta_c$ at least by solving the equation $$\frac{\lambda f_D(i)}{2} = V_a \sin\theta(i)(\theta_c - \theta(i)) + V_{r,c},$$

where $\lambda$ is the wavelength of the radar, $V_a$ is the norm of the speed of the carrier and $V_{r,c}$ is the radial speed of the target.

19 Claims, 3 Drawing Sheets

METHOD FOR ESTIMATING THE ANGULAR POSITION OF A TARGET BY RADAR DETECTION AND RADAR IMPLEMENTING SAID METHOD

CROSS-REFERENCE TO RELATED APPLICATION

This application claims priority to foreign French patent application No. FR 1004559, filed on Nov. 23, 2010, the disclosure of which is incorporated by reference in its entirety.

FIELD OF THE INVENTION

The present invention relates to the field of radars and in particular radars for searching mobile targets which are themselves equipping a mobile carrier. The invention applies advantageously to airborne maritime surveillance radars.

BACKGROUND

One objective of a surveillance radar is to detect and locate a target, mobile or not. The determination of the position of a target is done notably by estimating its angular position which is defined by the angle between a reference axis and the axis linking the radar, or its carrier, to the target. For example, when the reference axis points towards the geographic north, the angular position of the target is defined by the azimuth angle. When the reference axis is the axis of the carrier, the angular position of the target is defined by the relative bearing angle.

The general principle of a surveillance radar consists in emitting a series of pulses via a steerable antenna which scans the angular space to detect the presence of a potential target. If a target is actually present in the beam of the antenna, the signal pulses are reflected on this target and return echoes to the radar which includes suitable reception means. Means for processing and analysing the received echoes are implemented in order to deduce therefrom information concerning the location of the target, notably its angular position, its distance relative to the radar or even its speed.

Three methods for analysing the received signal to determine the angular position of a target using a radar are notably known.

A first known method uses a single-channel radar which performs an analysis of the amplitude (or of the power) of the received signal during the scanning of the antenna. The amplitude of the signal received by the radar varies according to the azimuth of the antenna following the appearance of the antenna pattern. The azimuth of the detected target is obtained by searching for the maximum amplitude. This principle is illustrated in FIG. 1.

The efficiency of this method, and in particular the accuracy of the estimation of the azimuth of the target, is greatly dependent on the signal-to-noise ratio in reception. The lower this ratio, the more difficult it is to detect the target because the noise can generate spurious amplitude spikes.

Another known method consists in performing an analysis of the received signals in the frequency domain. This type of method is implemented by single-channel radars said to be working in "Doppler mode". In such cases, the radar emits a series of pulses at different successive instants. The echoes received after reflection on the target are grouped together in blocks, a block comprising several pulses. For each pulse received, the azimuth, or the relative bearing, of the antenna is known to the radar, so an average azimuth is then defined for a block of pulses. By way of an analysis in the frequency domain of the pulses of a block, notably through a Fourier transform applied to this block, it is possible to detect the presence of the target by the level of the amplitude of the echoes received by the radar. Each block has an associated average azimuth of the antenna pointing direction. The angular locating of the target then consists in assigning, as estimate of the azimuth of the target, the average azimuth of the block for which a target is detected. The target may be detected on several consecutive blocks, a direction finding method can then be used in order to average the azimuth of the blocks by weighting them by the amplitude of the received signal.

This type of method has the drawback of limiting the azimuthal detection resolution to the angular resolution separating the average azimuth of two blocks and therefore indirectly to the size of a block. This drawback affects the efficiency of the detection with respect to the accuracy of the estimate of the angular position of the target. It is possible to remedy this drawback by implementing an azimuthal overlap between two or more consecutive blocks, but, the greater the rate of overlap, the more complex the calculation becomes, which affects the implementation cost.

A third known method consists in using a radar that has at least two reception channels. These two channels are commonly designated by the terms sum channel and delta channel, and the azimuth of the target is obtained by calculating the angle error measurement, for example taken to be equal to the scalar product of the signals obtained from each of the two channels. The angle error measurement value makes it possible to deduce therefrom the difference that there is between the angular position of the antenna and the real position of the target.

This third method presents the advantage of considerably increasing the angular location accuracy compared to the abovementioned second method, but it entails the use of a radar with two reception channels, a factor that increases the cost of the equipment.

SUMMARY OF THE INVENTION

The invention aims to remedy the abovementioned limitations of the known methods by proposing a method for determining the angular position of a target which substantially enhances the accuracy and in particular the variance of the estimations made. The invention requires the use of only one reception channel and also makes it possible to determine the radial speed of the target.

The main advantages of the invention are that it enhances the angular extraction accuracy and reduces fluctuations on the extracted azimuth.

To this end, the subject of the invention is a method for estimating the angular position $\theta_c$ of a target detected by a radar equipping a mobile carrier, said radar emitting, via an steerable antenna, a signal, in the form of pulses, towards the target and receiving echoes from the reflection of said signal on the target, said method being characterized in that it comprises at least the following steps:

a step of estimating, for each pulse or group of pulses of time index i, the angular position $\theta(i)$ of the antenna, a step of estimating, for each pulse or group of pulses of time index i, the Doppler frequency $f_D(i)$ of the echo or echoes received, a step of pairing, for each pulse or group of pulses of time index i, the angular position $\theta(i)$ and the Doppler frequency $f_D(i)$, a step of estimating the angular position $\theta_c$ at least by solving the equation $$\frac{\lambda f_D(i)}{2} = V_a \sin\theta(i)(\theta_c - \theta(i)) + V_{r,c},$$

in which $\lambda$ is the wavelength of the radar, $V_a$ is the norm of the speed of the carrier and $V_{r,c}$ is the radial speed of the target.

In a particular embodiment of the invention, the equation $$\frac{\lambda f_D(i)}{2} = V_a \sin\theta(i)(\theta_c - \theta(i)) + V_{r,c}$$

is solved by minimizing the mean square error $$E(\theta_c, V_{r,c}) = \sum_{i=1}^{N} \left( V_a \sin\theta(i)(\theta_c - \theta(i)) + V_{r,c} - \frac{\lambda f_D(i)}{2} \right)^2,$$

in which N is the number of pulses or of groups of pulses, the angular position $\theta_c$ and the radial speed $V_{r,c}$ of the target being assumed constant over the horizon N.

In another particular embodiment of the invention, the radial speed of the target $V_{r,c}$ is set to an a priori given value $V_{r,c}^{apriori}$ and that the angular position $\theta_c(i)$ of the target is taken to be equal to $$\theta_c(i) = \theta(i) + \frac{\lambda f_D(i) - V_{r,c}^{apriori}}{2V_a \sin\theta(i)}$$

for each pulse or group of pulses of time index i.

In a variant embodiment of the invention, the angular position $\theta_c(i)$ of the target is corrected by a measurement bias $$\delta\theta = \frac{\Delta V_{r,c}}{V_a \sin\theta},$$

in which $\Delta V_{r,c}$ is the offset between the a priori value $V_{r,c}^{apriori}$ of the radial speed of the target and its real value.

In a variant embodiment of the invention, the measurement bias $\delta\theta$ is determined from the difference between the average values of the angular positions of the antenna and the average values of the angular positions of the target.

In a variant embodiment of the invention, the measurement bias $\delta\theta$ is determined from a value of the radial speed of the target supplied by target tracking means.

In a variant embodiment of the invention, the angular positions are relative bearing or azimuth angles.

In a variant embodiment of the invention, the carrier is an aircraft.

In a variant embodiment of the invention, the radial speed of the carrier is estimated by an inertial unit equipping the carrier.

Also the subject of the invention is a surveillance radar comprising at least one steerable antenna, emission means for emitting a radar signal in the form of pulses, reception means for receiving echoes generated by the reflection of said pulses on the environment, means for estimating the angular position of the antenna, means for estimating the Doppler frequency of the received echo or echoes, means for pairing the angular position of the antenna and the Doppler frequency, said radar also being adapted to implement the steps of the method according to the invention.

BRIEF DESCRIPTION OF THE DRAWINGS

Other features and advantages of the invention will become apparent from reading the description, given as an example, given in light of the appended drawings in which.

DETAILED DESCRIPTION

Figure 1:
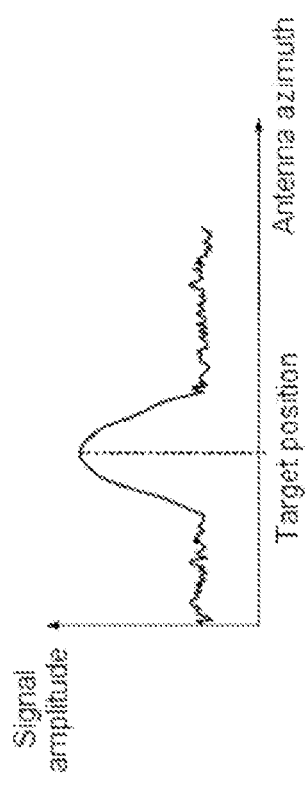
FIG. 1 represents a diagram of the amplitude of the signal received by a single-channel radar in non-Doppler mode according to the prior art.
Figure 2:
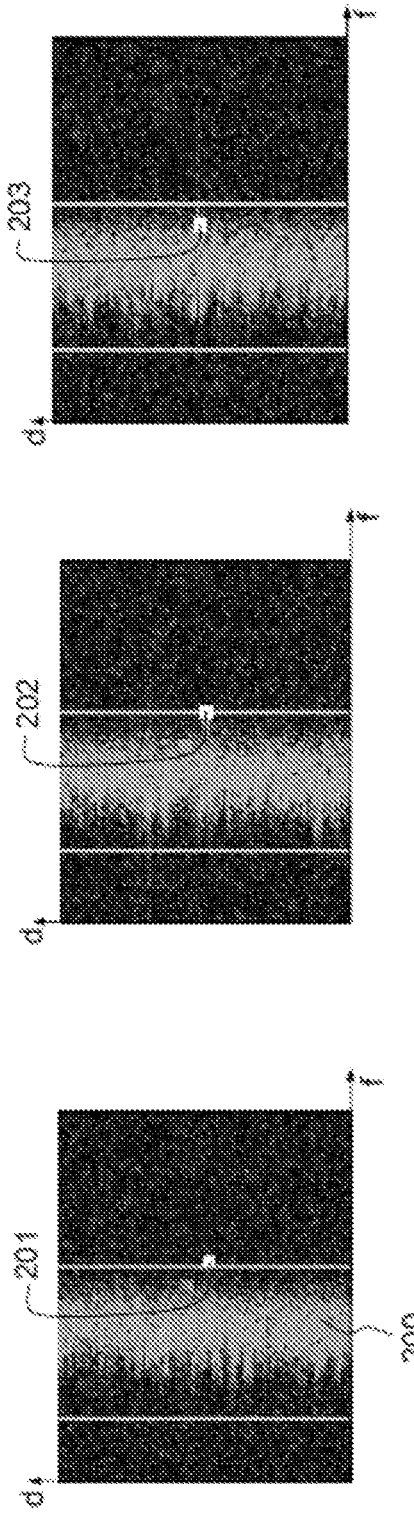
FIG. 2 represents three distance-frequency diagrams illustrating the principle of detection of a target by frequency analysis for a radar in Doppler mode.

FIG. 2 illustrates the principle of frequency analysis implemented by a surveillance radar known from the prior art for detecting a target and estimating its angular position.

Each of the three diagrams of FIG. 2 represents, for a direction of pointing of the antenna of the given radar, the trend, on the x axis, of the Doppler frequency, as a function, on the y axis, of the distance of the potential target. The diagrams are obtained from real data records. The Doppler frequency is understood here to be the frequency of the echo received by the radar from the reflection of the radar signal on the target. The three figures correspond, from left to right, to three successive pointing directions of the antenna when scanning in the clockwise direction. The Doppler frequency is, in each case, corrected by the average Doppler frequency corresponding to the radial speed of the carrier of the radar. In the three diagrams of FIG. 2, it can thus be seen that the Doppler frequency 200 of the echoes received from the non-target environment (commonly designated "clutter") remains fixed over a limited azimuthal segment. In fact, once the average Doppler frequency due to the radial speed of the carrier is compensated, the spectrum of the signal received by the radar exhibits similar characteristics over the angular segment of observation regardless of the pointing direction of the antenna. The position and the width of the spectrum of the clutter may, however, vary with, for example, the wind direction. On the other hand, it will be noted that the target, identified by its distance/Doppler frequency coordinates 201, 202, 203, exhibits a Doppler frequency which changes relative to that of the carrier of the radar in the passing of the antenna lobe. In a conventional angular extraction method, as explained previously, the angular position of the target is retained as equal to the angular direction of pointing of the radar antenna associated with the distance/frequency diagram for which a target has been detected. One drawback in this method is the lack of accuracy of the angular extraction which is limited by the frequency of the measurements performed by the radar during the angular scanning of the antenna.

Figure 3:
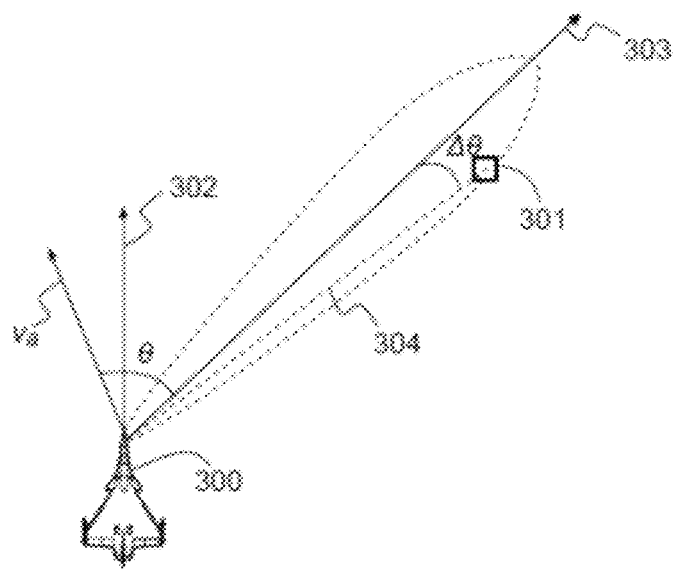
FIG. 3 represents a diagram illustrating the angular positioning of a target relative to an aircraft on which a radar according to the invention is used.

FIG. 3 diagrammatically represents the angular positioning of a target 301 relative to an aircraft 300 on which a radar according to the invention is used.

The aircraft 300 has a speed $\vec{V}_a$, of norm $V_a$, the direction of which may differ from the axis 302 of displacement of the aircraft. The antenna of the radar (not represented) equipping the aircraft has, at a given instant, a pointing direction 303 which forms an angular deviation $\Delta\theta$ with the axis 304 linking the aircraft 300 and the target 301. The target 301 is mobile and itself has a speed $\vec{V}_c$ of norm $V_c$. $V_{r,a}$ and $V_{r,c}$ are used to designate the respective radial speeds of the aircraft and of the target which correspond to their projections on the line of sight of the radar.

The relative radial speed $V_r$ of the wave received and measured by the radar in the direction of pointing of the antenna is linked to the Doppler frequency $f_D$ by the following relationship:

$$V_r = \lambda f_D / 2 \quad (1)$$

with $\lambda$ being the wavelength of the signal emitted by the radar. The radial speed $V_r$ corresponds to the sum of three terms, the radial speed $V_{r,a}$ of the aircraft, the radial speed $V_{r,c}$ of the target and a component $\Delta V_r$ which results from the angular deviation $\Delta\theta$ between the direction of pointing of the antenna and the direction of the target. The total radial speed $V_r$ is therefore expressed using the following relationship:

$$V_r = V_{r,a} + \Delta V_r + V_{r,c} \quad (2)$$

The radial speed $V_{r,a}$ of the aircraft can be estimated by means external to the invention, for example by an inertial unit equipping board the craft. It can thus be compensated by suitable processing operations such that the radial speed measured by the radar becomes:

$$V_r = \Delta V_r + V_{r,c} \quad (3)$$

The component $\Delta V_r$ is expressed as a function of the angular deviation $\Delta\theta$ and of the speed of the carrier by the following relationship, by making the likely assumption that the angular deviation $\Delta\theta$ is low:

$$\Delta V_r = V_a \sin\theta \Delta\theta \quad (4)$$

$\Delta V_r$, which translates the radial speed offset induced by the angular deviation between the line of sight and the direction of the target, is obtained by deriving the expression of the radial speed $V_{r,a} = V_a \cos\theta$ of the carrier relative to the relative bearing angle.

By combining the relationships (1), (3) and (4), the following equation is obtained:

$$\frac{\lambda f_D}{2} = V_a \sin\theta \Delta\theta + V_{r,c} \quad (5)$$

The equation (5) is an equation with two unknowns, the angular deviation $\Delta\theta$, which indirectly gives the angular position of the target in terms of azimuth or in terms of relative bearing and the radial speed $V_{r,c}$ of the target. The wavelength $\lambda$ of the radar and the speed of the aircraft are data that are a priori known. The angle $\theta$, which corresponds to the relative bearing of the antenna of the radar, is also known and the Doppler frequency $f_D$ of the echoes received by the radar is measured for each value of the angle $\theta$ during the scanning of the antenna.

In a first particular embodiment of the invention, if the target to be detected is fixed, its radial speed $V_{r,c}$ and the angular deviation $\Delta\theta$ can be estimated from the following relationship $$\Delta\theta = \frac{\lambda f_D}{2 V_a \sin\theta},$$

for each pair of values ($f_D$, $\theta$) obtained from a detection determined by the radar. The precise relative bearing of the target is then obtained by adding the relative bearing angle $\theta$ of the antenna to the angular deviation $\Delta\theta$. The relative bearing values of the target obtained can be averaged in order to deduce a precise angular position of the target therefrom.

In another embodiment of the invention, for which the radial speed of the target is not zero, the equation (5) then includes two unknowns. If a sufficient number of measurements of the Doppler frequency performed by the radar is available in a sufficiently short time interval, the radial speed of the target is assumed constant over that interval. In such a case, an optimization algorithm is used to determine the values of the unknowns $\Delta\theta$ and $V_{r,c}$ from the measurements of the Doppler frequency for different relative bearing angles $\theta$ of the radar antenna.

The method according to the invention then consists, for example, in determining the pair of values ($\hat{\theta}_c$, $\hat{V}_{r,c}$) which minimizes the mean-square error between the two members of the equation (5). The mean square error is calculated as follows:

$$E(\theta_c, V_{r,c}) = \sum_{i=1}^{N} (V_a \sin\theta(i)(\theta_c - \theta(i)) + V_{r,c} - V_r(i))^2 \quad (6)$$

with N being the number of measurements performed on the one hand on the radial speed $V_r(i)$ and on the other hand on the relative bearing of the radar antenna $\theta(i)$. The radial speed $V_r(i)$ is measured from the Doppler frequency $f_D(i)$ of the received echo, $$V_r(i) = \frac{\lambda f_D(i)}{2}.$$

$\theta_c = \theta(i) + \Delta\theta$ is the relative bearing angle of the target that is to be determined.

It will be noted that, in addition to the angular position of the target, the method according to the invention also makes it possible to determine an estimate of the radial speed of the target. Also, the method is applicable only when the pointing axis 303 of the antenna is not collinear to the axis 302 of the carrier because, otherwise, the angle $\theta$ becomes zero and the minimizing of the squared error according to the relationship (6) is no longer possible.

Figure 4:
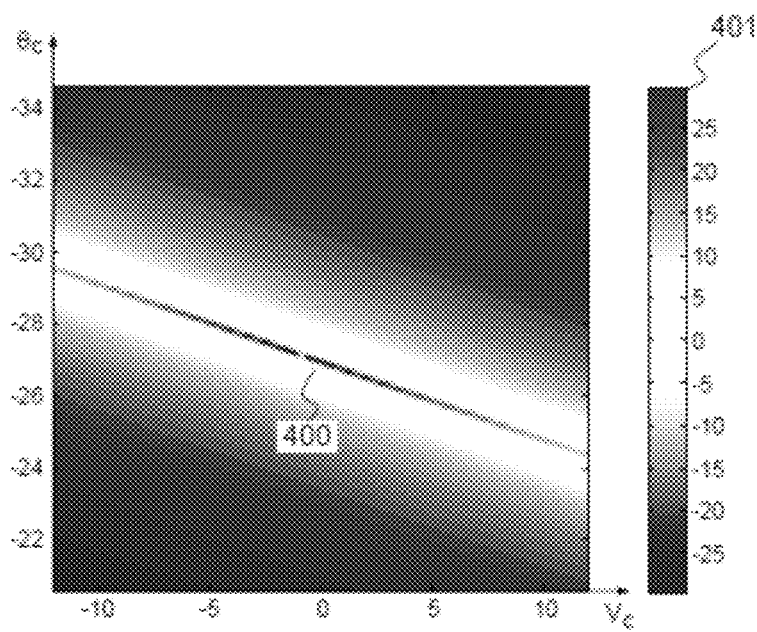
FIG. 4 represents a diagram of the angular position of the target as a function of its radial speed obtained according to one embodiment of the invention.

FIG. 4 represents an exemplary graph of the mean square error according to the relationship (6) as a function of the radial speed of the target $V_{r,c}$ on the x axis and of the relative bearing angle $\theta_c$ of the target on the y axis. The amplitude of the error is given in decibels on the scale 401 and is determined from real measurements. Three measurements have been made with an accuracy of 0.15 m/s for the radial speed $V_r$ by virtue of a measurement of the Doppler frequency over 160 radar recurrences with a recurrence frequency of 1650 Hz and a radar emission in band X. The target concerned is a buoy with a surface area of 5 m². The measurements of the relative bearing of the radar antenna are spaced in time by 50 ms and are performed during the passage of the antenna lobe over the target with a rotation of 6 revolutions per minute. The three sets of measurements are indicated in the table below.

|  | θ (degrees) | | |
|---|---|---|---|
|  | −28.69 | −27.91 | −26.15 |
| $V_r$ (m/s) | 0.39 | 0.86 | 1.95 |

The point 400 of coordinates $\hat{\theta}_c=-27.1°$ and $\hat{V}_{r,c}=-0.8$ m/s is the point which minimizes the mean square error function.

Without departing from the framework of the invention, other methods for solving the equation (5) can be envisaged, for example least squares methods.

In some cases, the radial speed of the target cannot be considered constant over the entire duration of the measurements performed by the radar. Such is the case, for example, when the measurements of the radial speed $V_r$ are too spaced apart in time or the target is subject to significant fluctuations in its speed. In these conditions, the method according to the embodiment of the invention described above cannot be applied because it requires a constant radial speed throughout the duration of the measurements performed.

In another variant embodiment of the invention, the relative bearing angle of the target is determined by setting, a priori, the value of the radial speed of the target at a given value, for example zero. The equation (5) then has only a single unknown and the relative bearing angle is estimated using the following relationship $$\theta_c(i) = \theta(i) + \Delta\theta = \theta(i) + \frac{\lambda f_D(i) - V_{r,c}^{apriori}}{2V_a \sin\theta(i)}$$

for each measurement i varying from 1 to N.

The value of the relative bearing angle $\theta_c$ is affected by a bias $$\delta\theta = \frac{\Delta V_{r,c}}{V_a \sin\theta},$$

in which $\Delta V_{r,c} = V_{r,c} - V_{r,c}^{apriori}$ is the offset between the value given, a priori, to the radial speed of the target and its real value. However, one advantage of the method according to the invention lies in the angular correction $\Delta\theta$ which makes it possible to reduce the variance on the measurements of the relative bearing angle $\theta_c$.

The bias $\delta\theta(i)$ resulting from not knowing the radial speed of the target can be compensated by calculating the difference between the average values of the measurements of the relative bearing of the antenna $\theta(i)$ and the measurements of the relative bearing of the target $\theta_c(i)$, and by adding said difference to the measurements of the relative bearing angle $\theta_c(i)$ obtained, the average preferably being calculated over a short time horizon. The abovementioned variant embodiment of the invention is applicable in the case where the radial speed of the target is not constant over the time horizon of the measurements performed by the radar. It also includes a benefit in the case where it is desirable to limit the complexity of the processing operations and where the desired accuracy relates only to the variance of the estimate $\theta_c$ and not to its absolute value.

Figure 5:
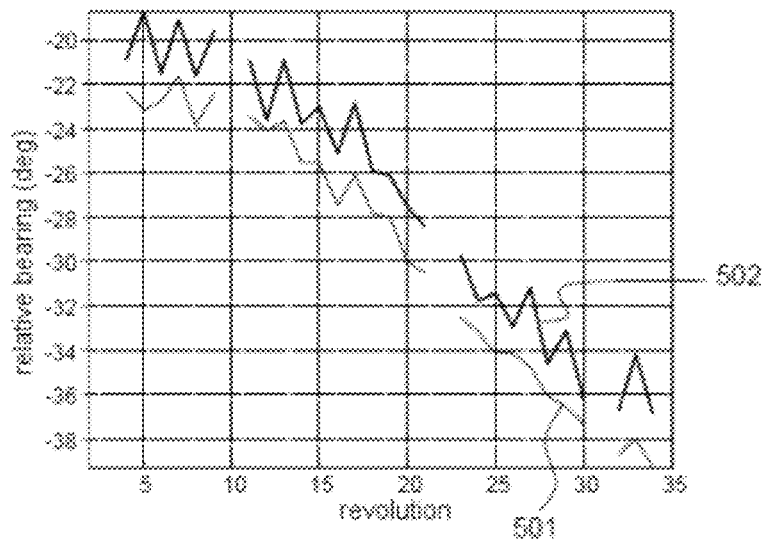
FIG. 5 represents a diagram of the angular position of the target as a function of the number of antenna revolutions obtained according to another embodiment of the invention.

FIG. 5 illustrates the trend, on one diagram, of the relative bearing angle 501 of the target obtained with the method according to the invention in the embodiment described previously in comparison to that of the relative bearing angle 502 of the antenna. The measurements have been performed on real data and over a set of 35 antenna revolutions. For certain antenna revolution values, no angular value is extracted because the target is not detected. It is interesting to note that the curve of variation of the relative bearing angle 501 obtained using the method according to the invention exhibits a standard deviation that is lower than the curve 502 obtained directly by the use of the relative bearing angles of the radar antenna. The two curves 501, 502 are substantially parallel to one another and spaced apart by an angular deviation which corresponds to the abovementioned measurement bias.

Figure 6:
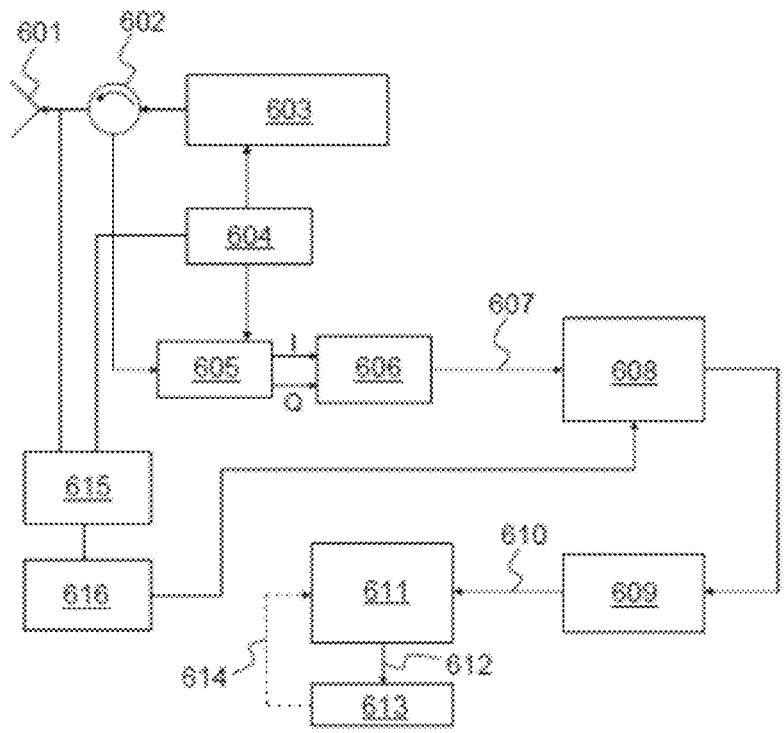
FIG. 6 represents a block diagram of a surveillance radar implementing the method according to the invention.

FIG. 6 represents a block diagram of a surveillance radar 600 adapted to implement the method according to the invention. It comprises an steerable radar antenna 601 suitable for emitting and receiving radar signals, notably in the form of pulses, and a circulator 602 suitable for routing the signals emitted or received between the antenna 601 and the emitting 603 and receiving 605 functions of the radar 600. The radar antenna 601 may be an antenna with mechanical scanning or with electronic scanning for which the beam can be oriented. The emission function 603 of the radar produces a radar signal, for example in the form of blocks of data comprising N pulses. The reception function 605 of the radar performs a coherent reception of the echoes received by the antenna 601 originating from the reflection of the radar signal on the environment situated in the beam of the antenna and in particular on the potential targets to be detected in this environment. A device 604 for driving and sequencing the functionalities is inserted between the emission 603 and reception 605 functions. The output signal of the reception means 605 is supplied, in the form of a channel I in phase and a channel Q in quadrature, as input to a coherent signal processing module 606 which performs, notably, a Fourier transform on the signal in order to be able to perform an analysis in the frequency domain. The module 606 produces at its output, for each signal block, a table 607 of amplitude of the signal as a function, on the one hand, of the distance between the target and the antenna 601, and on the other hand of the Doppler frequency. The tables 607 are of the type of those represented in FIG. 2 with a sampling in distance and in frequency modes. The surveillance radar 600 also comprises a module 615 that makes it possible to associate with each emitted signal pulse the relative bearing of the antenna at the instant of its emission. A processing module 616 then establishes an average relative bearing angle θ associated with a block of pulses, this angle being transmitted to a module 608 which relates, by pairing, the average antenna relative bearing angle θ with each distance/Doppler frequency table 607. The radar 600 also comprises a function 609 for thresholding and generating blips. A blip is a term commonly used in the field of radars to designate a distance/frequency cell of a table 607 for which a target has been detected because the amplitude of the signal for this cell exceeds a predetermined detection threshold. A blip 610 is thus defined, notably, by the relative bearing angle of the antenna, the distance of the target and its Doppler frequency or its radial speed which can be deduced from the Doppler frequency.

The radar 600 according to the invention also comprises a module 611 for estimating the relative bearing, or more generally the angular position, of the target or targets detected using the method according to the invention as described previously in its different embodiments. The module 611 produces as output an estimate 612 $\theta_c$ of the angular position of the target, possibly accompanied by the estimated measurement bias when the radial speed of the target is set to an a priori value.

In a particular embodiment of the invention, these estimations 612 are supplied to a tracking module 613 which uses the estimated angular position of the target, at different successive instants, in order to track the displacement of this target. A tracking module 613 uses, for example, a Kalman filtering fed by the angular position estimates in order to perform the tracking of the displacement of the target.

In another embodiment of the invention, the tracking module 613 can provide an estimate 614 of the radial speed of the target which can be used to correct the measurement bias $\delta\theta$.

The invention claimed is:

1. A method of estimating an angular position $\theta_c$ of a target detected by a radar equipping a mobile carrier, said radar emitting, via a steerable antenna, a signal in the form of pulses towards the target and receiving echoes from reflection of said signal on the target, the method being executed by the radar and comprising:

estimating, for each pulse or group of pulses of time index i, an angular position $\theta(i)$ of the antenna, estimating, for each pulse or group of pulses of time index i, a Doppler frequency $f_D(i)$ of the echo or echoes received, pairing, for each pulse or group of pulses of time index i, the angular position $\theta(i)$ and the Doppler frequency $f_D(i)$, and estimating the angular position $\theta_c$ of the target at least by solving the equation $$\frac{\lambda f_D(i)}{2} = V_a \sin\theta(i)(\theta_c - \theta(i)) + V_{r,c},$$

in which $\lambda$ is a wavelength of the radar, $V_a$ is a norm of a speed of the carrier and $V_{r,c}$ is a radial speed of the target, wherein the equation $$\frac{\lambda f_D(i)}{2} = V_a \sin\theta(i)(\theta_c - \theta(i)) + V_{r,c}$$

is solved by minimizing mean square error $$E(\theta_c, V_{r,c}) = \sum_{i=1}^{N} \left( V_a \sin\theta(i)(\theta_c - \theta(i)) + V_{r,c} - \frac{\lambda f_D(i)}{2} \right)^2,$$

in which N is a number of the pulses or of the groups of pulses, and the angular position $\theta_c$ and the radial speed $V_{r,c}$ of the target are equal to a constant over N.

2. The method according to claim 1, wherein the angular positions are relative bearing or azimuth angles.

3. The method according to claim 1, wherein the carrier is an aircraft.

4. The method according to claim 1, wherein the speed $V_{r,c}$ of the carrier is estimated by an inertial unit equipping the carrier.

5. A method of estimating an angular position $\theta_c$ of a target detected by a radar equipping a mobile carrier, said radar emitting, via a steerable antenna, a signal in the form of pulses towards the target and receiving echoes from reflection of said signal on the target, the method being executed by the radar and comprising:

estimating, for each pulse or group of pulses of time index i, an angular position $\theta(i)$ of the antenna, estimating, for each pulse or group of pulses of time index i, a Doppler frequency $f_D(i)$ of the echo or echoes received, pairing, for each pulse or group of pulses of time index i, the angular position $\theta(i)$ and the Doppler frequency $f_D(i)$, and estimating the angular position $\theta_c$ of the target at least by solving the equation $$\frac{\lambda f_D(i)}{2} = V_a \sin\theta(i)(\theta_c - \theta(i)) + V_{r,c},$$

in which $\lambda$ is a wavelength of the radar, $V_a$ is a norm of a speed of the carrier and $V_{r,c}$ is a radial speed of the target, wherein the radial speed of the target $V_{r,c}$ is set to an a priori given value $V_{r,c}^{apriori}$ and the angular position $\theta_c(i)$ of the target is equal to $$\theta_c(i) = \theta(i) + \frac{\lambda f_D(i) - V_{r,c}^{apriori}}{2 V_a \sin\theta(i)}$$

for each pulse or group of pulses of time index i.

6. The method according to claim 5, wherein the angular position $\theta_c(i)$ of the target is corrected by a measurement bias $$\delta\theta = \frac{\Delta V_{r,c}}{V_a \sin\theta},$$

in which $\Delta V_{r,c}$ is an offset between the a priori value $V_{r,c}^{apriori}$ of the radial speed of the target and a real value of the radial speed of the target $V_{r,c}$.

7. The method according to claim 6, wherein the measurement bias $\delta\theta$ is determined based on a difference between average values of the angular positions of the antenna and the average values of the angular positions of the target.

8. The method according to claim 6, wherein the measurement bias $\delta\theta$ is determined based on a value of the radial speed of the target supplied by target tracking apparatus.

9. The method according to claim 5, wherein the angular positions are relative bearing or azimuth angles.

10. The method according to claim 5, wherein the carrier is an aircraft.

11. The method according to claim 5, wherein the speed $V_{r,c}$ of the carrier is estimated by an inertial unit equipping the carrier.

12. A surveillance radar comprising:

at least one steerable antenna, an emitter configured to emit a radar signal in the form of pulses, a receiver configured to receive echoes generated by reflection of said pulses on an environment, an estimator configured to estimate an angular position of the antenna, an estimator configured to estimate a Doppler frequency of the received echo or echoes, and a module configured to pair the angular position of the antenna and the Doppler frequency, said radar being configured to: estimate, for each pulse or group of pulses of time index i, an angular position $\theta(i)$ of the antenna, estimate, for each pulse or group of pulses of time index i, a Doppler frequency $f_D(i)$ of the echo or echoes received, pair, for each pulse or group of pulses of time index i, the angular position θ(i) and the Doppler frequency $f_D(i)$, and estimate the angular position $θ_c$ of the target at least by solving the equation $$\frac{\lambda f_D(i)}{2} = V_a \sin θ(i)(θ_c - θ(i)) + V_{r,c},$$

in which λ is a wavelength of the radar, $V_a$ is a norm of a speed of a carrier and $V_{r,c}$ is a radial speed of the target,
wherein the equation $$\frac{\lambda f_D(i)}{2} = V_a \sin θ(i)(θ_c - θ(i)) + V_{r,c}$$

is solved by minimizing mean square error $$E(θ_c, V_{r,c}) = \sum_{i=1}^{N} \left( V_a \sin θ(i)(θ_c - θ(i)) + V_{r,c} - \frac{\lambda f_D(i)}{2} \right)^2,$$

in which N is a number of the pulses or of the groups of pulses, and the angular position $θ_c$ and the radial speed $V_{r,c}$ of the target are equal to a constant over N.

13. The surveillance radar according to claim 12, wherein the angular positions are relative bearing or azimuth angles.

14. The surveillance radar according to claim 12, wherein the carrier is an aircraft.

15. The surveillance radar according to claim 12, wherein the speed $V_{r,c}$ of the carrier is estimated by an inertial unit equipping the carrier.

16. A surveillance radar comprising:
at least one steerable antenna,
an emitter configured to emit a radar signal in the form of pulses,
a receiver configured to receive echoes generated by reflection of said pulses on an environment,
an estimator configured to estimate an angular position of the antenna,
an estimator configured to estimate a Doppler frequency of the received echo or echoes, and
a module configured to pair the angular position of the antenna and the Doppler frequency,
said radar being configured to: estimate, for each pulse or group of pulses of time index i, an angular position θ(i) of the antenna,
estimate, for each pulse or group of pulses of time index i, a Doppler frequency $f_D(i)$ of the echo or echoes received,
pair, for each pulse or group of pulses of time index i, the angular position θ(i) and the Doppler frequency $f_D(i)$, and
estimate the angular position $θ_c$ of the target at least by solving the equation $$\frac{\lambda f_D(i)}{2} = V_a \sin θ(i)(θ_c - θ(i)) + V_{r,c},$$

in which λ is a wavelength of the radar, $V_a$ is a norm of a speed of a carrier and $V_{r,c}$ is a radial speed of the target,
wherein the radial speed of the target $V_{r,c}$ is set to an a priori given value $V_{r,c}^{apriori}$ and the angular position $θ_c(i)$ of the target is equal to $$θ_c(i) = θ(i) + \frac{\lambda f_D(i) - V_{r,c}^{apriori}}{2 V_a \sin θ(i)}$$

for each pulse or group of pulses of time index i.

17. The surveillance radar according to claim 16, wherein the angular positions are relative bearing or azimuth angles.

18. The surveillance radar according to claim 16, wherein the carrier is an aircraft.

19. The surveillance radar according to claim 16, wherein the speed $V_{r,c}$ of the carrier is estimated by an inertial unit equipping the carrier.

* * * * *